United States Patent Office 3,679,552
Patented July 25, 1972

3,679,552
CELLULAR STRUCTURES
Roy Jervis, Sutton Coldfield, England, assignor to
Dunlop Holdings Limited, London, England
Continuation-in-part of application Ser. No. 847,428,
Aug. 4, 1969. This application June 29, 1970, Ser.
No. 50,383
Claims priority, application Great Britain, June 21, 1969,
31,473/69
Int. Cl. C23b 5/50, 5/52
U.S. Cl. 204—37 R
17 Claims

ABSTRACT OF THE DISCLOSURE

A method of producing a cellular structure which comprises electroplating a metal on a conductive porous substrate to produce a layer of metal on said substrate and subsequently alloying the metal by contacting it with at least one alloying component or a precursor thereof at an elevated temperature in order to introduce said alloying component and thus produce a porous alloy structure. The product alloy structures are useful in applications where metal cellular structures are required to have particular properties, for example high physical strength or good heat resistance.

---

Figure 1:
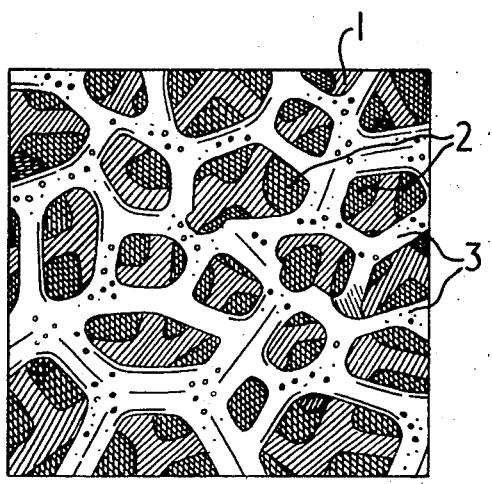

This invention relates to cellular structures.

The present application is a continuation-in-part of my application Ser. No. 847,428 filed Aug. 4, 1969 and now abandoned.

According to the present invention a method of producing a cellular structure comprises electroplating a metal on a conductive porous substrate to produce a layer of the metal on said substrate and subsequently alloying the metal by contacting it with at least one alloying component or a precursor thereof at an elevated temperature in order to introduce said alloying component and thus produce a porous alloy structure.

The metal which is electroplated onto the conductive porous substrate can be any metal which will electroplate. This metal may be a metal of Group I, Group IV, Group VI or Group VIII of the Mendeleeff Periodic Table, particularly Periods 4 or 5 in these Groups.

Preferred metals are nickel, copper, cobalt, iron, titanium, chromium or molybdenum.

The alloying component is a material which is capable of forming an alloy with the metal of the electroplated structure. The alloying component may be a metal of Group II, Group III, Group IV, Group VI or Group VIII of the Mendeleeff Periodic Table, particularly Periods 2, 3, 4 and 5 in these Groups, or it may be carbon, silicon or nitrogen. Examples of metals which may be alloyed with the metal structure are beryllium, zinc and cadmium; boron and aluminium; titanium, zirconium and tin; chromium, molybdenum and tungsten; and cobalt and nickel.

Preferred alloying components are carbon, nitrogen, silicon, chromium, aluminium, molybdenum, tin, zinc, titanium, tungsten, iron, vanadium, manganese, zirconium and copper. Alloys containing one or more of these elements may also be introduced.

In addition to the main alloying component or components further elements may be introduced in relatively minor quantities.

The porous structure is preferably one which is in the form of a skeletal three-dimensional network which defines a plurality of cellular spaces which intercommunicate with one another.

The conductive porous substrate may be a porous plastics material which is rendered inherently conductive or which has been rendered conductive by a surface treatment. Advantageously, the porous plastics material is a reticulated polyurethane foam.

The porous substrate may be in the form of agglomerate of fibres such as a felted material, or a sponge-like or foam material, such as natural sponge or a synthetic resinous foam. In general, polyurethane foams are preferred. The porous material may be removed, e.g. by heating to melt or "ash-out" the material.

Where a high degree of porosity is required, the foam may be a reticulated foam, i.e. a foam in which the organic phase is a three-dimensional network with no substantial well portions defining the cells. Such reticulated foams may be produced by removing the relatively thin cell walls from a foam, e.g. by chemical means such as aqueous sodium hydroxide in the case of polyurethane foams.

When the metal is to be electrodeposited it is, of course, necessary either to use a porous material which is electrically-conducting or to render the material conducting by means of a conducting surface layer. Non-conductive materials may be made self-conducting by means of an additive such as graphite or a powdered metal. A conducting surface layer may be applied by coating the material with a curable resinous material incorporating a conductive additive or by chemically depositing a metal thereon, e.g. by the reduction of ammoniacal silver nitrate in situ. In general, where chemical deposition is employed the surface should be treated with one or more sensitising agents such as stannous chloride followed by palladium chloride for silver.

Alloy structures of the first metal can be produced in some cases by direct plating and in other cases two or more metals may be deposited successively and the alloy formed by heating the resultant structure. Steel foams can be produced by the incorporation of the required amounts of carbon and/or nitrogen. The carbon may be derived from organic material forming the basic foam or added to an electroplating bath. Such alloy structures are subsequently alloyed further by the method of the invention.

The alloying of the electroplated structure may be carried out by heating the latter to an elevated temperature whilst in contact with powdered alloying component or a compound thereof, preferably in a reducing atmosphere. If desired, the powdered metal or compound may be used in conjunction with a diluent such as a refractory powder.

The alloying may be carried out in the presence of a carrier compound which is preferably a halide such as a chloride. This may comprise up to 10 percent by weight of the alloying mixture, more preferably up to 5 percent. The carrier compound may be passed over the alloying component or a compound thereof whilst it is in contact with the structure to be alloyed or may be generated in situ.

In an alternative method of alloying, the metal structure is disposed within a molten salt bath under a protective atmosphere, such as inert gas. The salt may be a halide of the alloying component, such as chromium chloride.

In a further alternative method of alloying, a gaseous method is used. The metal structure is subjected to the gas generated by heating a mixture of the alloying component in powdered form, such as powdered chromium, a filler, such as kaolin, alumina or magnesia, and a halide, such as ammonium fluoride. The structure is heated to an elevated temperature, e.g. 1100° C., in an atmosphere of hydrogen.

In some applications, for example, in corrosion-resistant structures, it is desirable that a substantially constant composition is obtained across a strut wall. This can be achieved by appropriate selection of the alloying component and the conditions of treatment.

This invention is particularly described in the following examples and with reference to the accompanying drawings in which:

FIG. 1 shows a three-dimension skeletal structure 1 arranged so as to define a plurality of cellular spaces 2 which intercommunicate with one another. This skeletal structure comprising struts 3 which are made of metal alloy.

FIGS. 2 to 7 are graphs which give the alloy compositions across a strut for various examples.

EXAMPLE I

A reticulated polyurethane having a porosity of 10 pores/inch was rendered conductive by means of ammoniacal silver nitrate and plated with iron in an electroplating bath. The electroplated structure was heated to a temperature of 650° C. in a slow air-stream which burned out the original polyurethane substrate and the structure was then brightened and annealed by heating in a reducing furnace at 1050° C.

Two such samples were prepared, one of which was carburised to give a carbon content of 1 percent.

The resulting structures were analysed by an electron steel drum with a chromizing compound and the drum placed in a furnace which is flushed with argon for 3 hours until the processing temperature of 1050° C. is reached. After this time the argon supply is discontinued and hydrogen passed into the furnace. This treatment is continued for 6 hours after which the drums are cooled slowly in an argon atmosphere. The total process cycle time is 24 hours.

The chromizing compound consisted of 40 percent fine chromium powder, 0.2 percent ammonium bromide, 0.02 percent chromium chloride and the balance, kaolin powder.

The resulting structures were each packed into an open probe micro-analysis of the cross-section of the struts. In the case of the carburised structure there was an even distribution of chromium throughout the strut which varied from 30 to 33 percent chromium, but the non-carburised structure had a much less even distribution in that a high concentration of chromium was found in the surface of a strut but a relatively small concentration of chromium was found near the centre of a strut.

EXAMPLE II

A porous iron structure prepared as in Example I was contacted with chromous chloride produced by reacting hydrogen and hydrogen chloride with chromium. The chromous chloride is believed to act as an active chromium carrier which releases free chromium at the metal surface, which chromium diffuses inwardly into the iron to produce an alloy structure. It is found that the coating contained from 10 to 30 percent of chromium.

EXAMPLE III

A porous iron structure prepared as in Example I was placed in an airtight box with a mixture of powdered aluminium, aluminium oxide and aluminum chloride, and heated for 12 hours at a temperature of 900° C. An aluminum-iron alloy structure resulted.

EXAMPLE IV

A porous iron structure prepared as in Example I was heated in a closed box with a mixture of silicon carbide and chlorine for 2 hours at a temperature of 950° C. The resulting structure comprised a siliconized iron in which the surface contained about 14 percent silicon.

EXAMPLE V

A porous iron structure prepared as in Example I was heated in a closed container in contact with zinc powder for a period of 3 hours at a temperature of 370° C. A zinc-iron alloy structure resulted.

EXAMPLE VI

A sample of reticulated polyurethane foam ½ inch thick having a porosity of 56–64 pores per inch was rendered conductive and plated with nickel in a nickel plating bath. The resultant plated structure was then heated in order to "ash-out" the polyurethane substrate and annealed.

The nickel structure was then disposed within a container which is filled with a mixture of powdered ferro chromium and alumina. This is then heated for about 4 hours at 1300° C. in an atmosphere of hydrogen.

The resulting chromised samples were examined by electron probe micro-analysis, the part examined in each case being the cross-section of a strut wall taken from the inside of a block of the porous structure.

This method of analysis comprises exciting a small area of the sample by means of a finely focussed beam of electrons so that X-rays are emitted. An analysis of the wavelength and intensity of these X-rays allows the determination of the type and amount of the elements present in the sample.

Since at the edge of a sample the whole of the electron beam will not impinge on the surface, and also because in the case of the cellular structure of this invention, the strut surface may not be normal to the electron beam, the resolution of the instrument is reduced, the atomic number of the elements being studied will be one of the factors determining the loss of resolution, which may be up to 3 to 4 microns. This means that even in the case of a homogeneous alloy the physical edge of the sample may not coincide with the portion on the trace where the element content becomes constant. This explains the apparent fall off in percentage of the elements, towards the edges of the strut, shown in the graphs.

Figure 2:
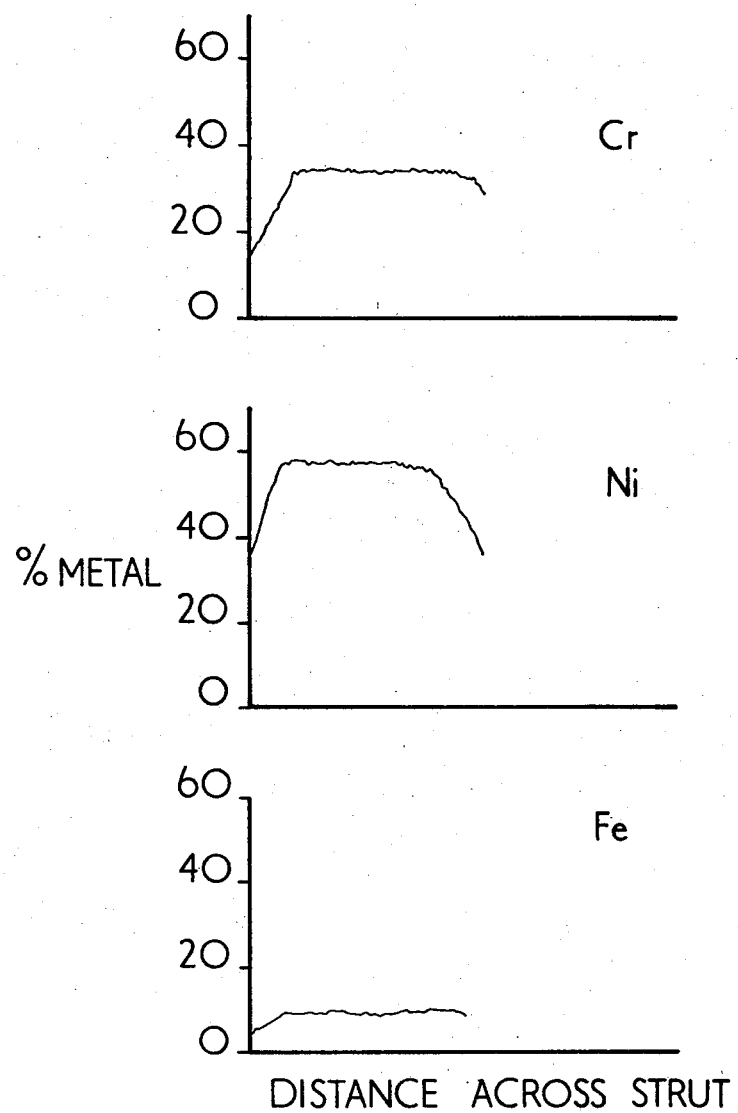

The results of this analysis are shown in FIG. 2 of the accompanying drawings. It can be seen that the composition is reasonably constant in the body of the strut.

The alloy has 3 components, i.e. nickel which is derived from the electroplated structure, and chromium and iron which are derived from the ferro chromium. It will be appreciated that the use of chromium instead of ferro chromium would produce a structure comprising a chromium-nickel alloy.

EXAMPLE VII

Figure 3:
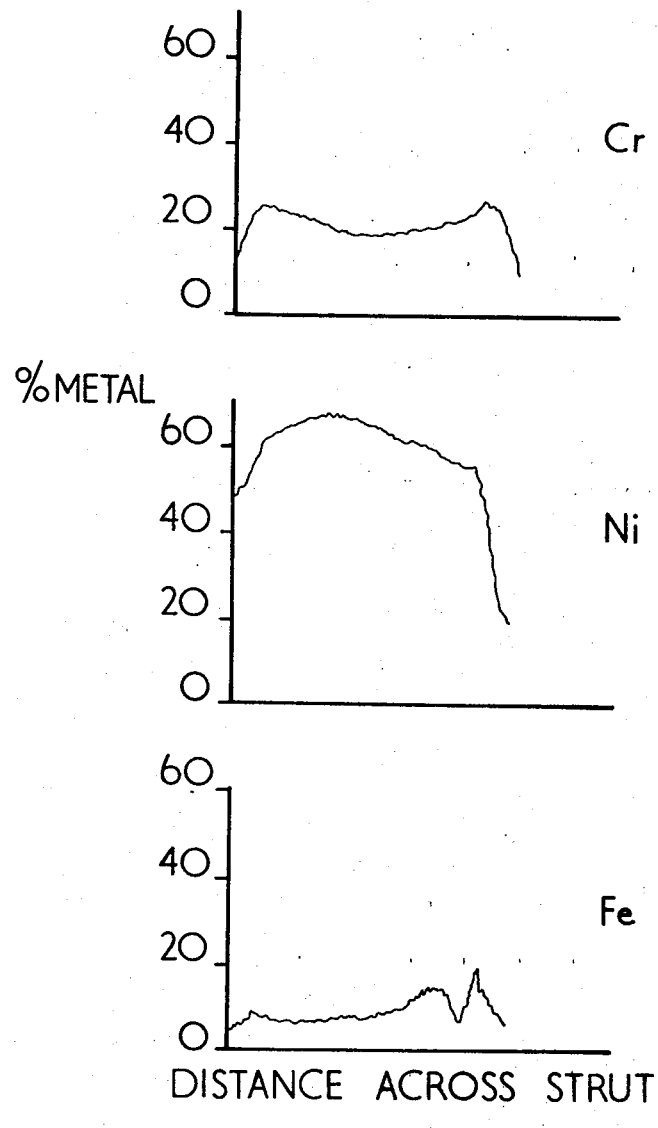

Example I was repeated using a substrate having a porosity of 33–42 pores per inch and ½ inch thick, and an analysis across a strut wall is shown in FIG. 3 of the accompanying drawings. It will be seen that the composition across the strut is more variable than was the case in Example I. This is due to the fact that the walls in the coarser foam have a greater thickness.

EXAMPLES VIII to XI

½ inch thick samples of the basic porous metal structures, containing 56–64 pores per inch, listed in Table I, were subjected to an alloying process similar to that described in Example I. The elements introduced into each, being those listed. The analysis across a strut, for a strut taken from the centre of each sample is shown in the corresponding figure of the accompanying drawings.

TABLE I

Figure 4:
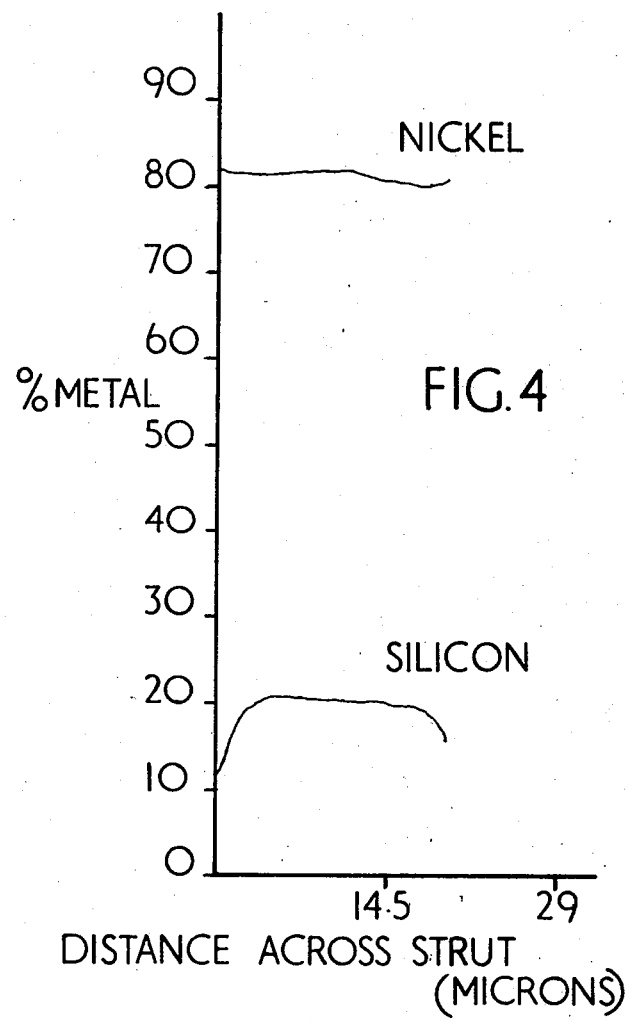
Figure 5:
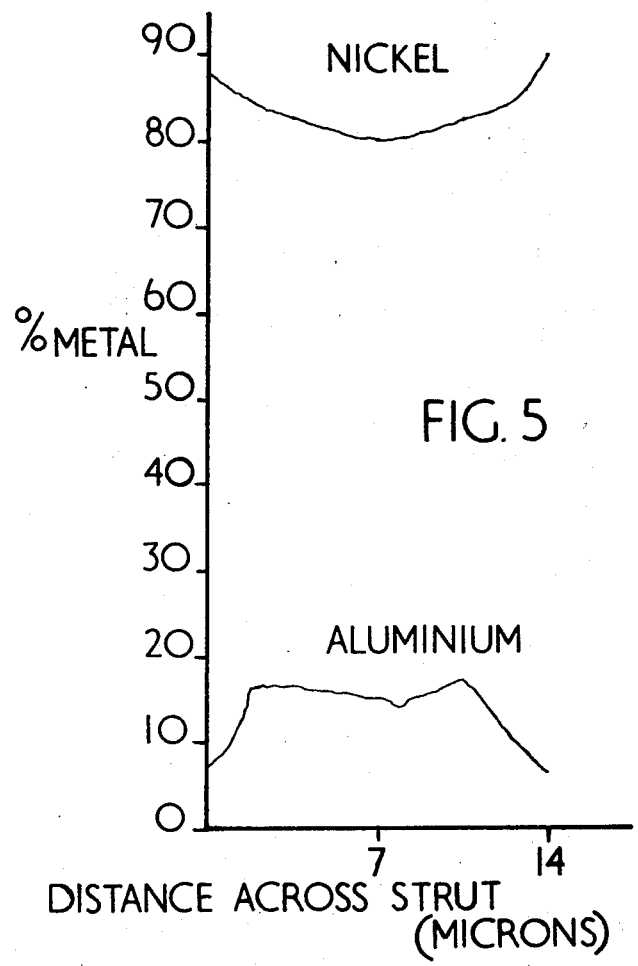
Figure 6:
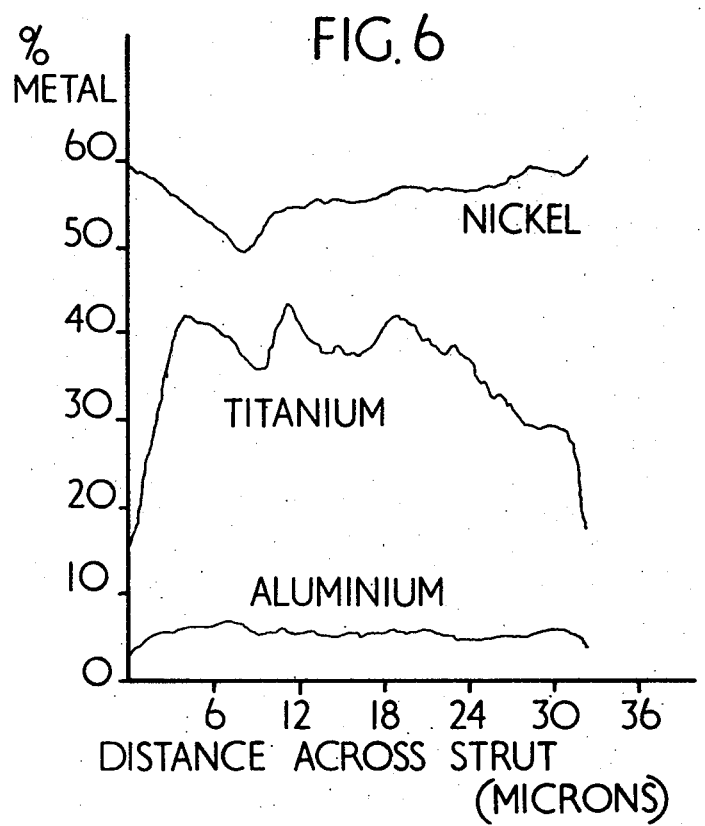
Figure 7:
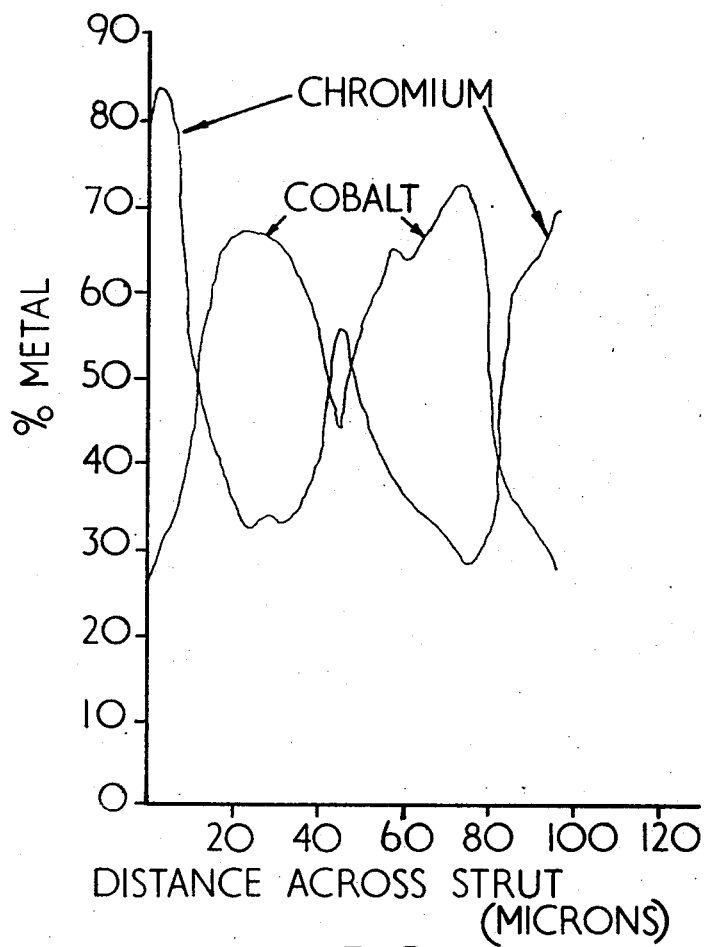

| Example | Basic porous metal structure | Alloying elements | Analysis across strut |
|---|---|---|---|
| VIII | Nickel | Silicon | Figure 4. |
| IX | do | Aluminium | Figure 5. |
| X | do | Titanium, aluminium. | Figure 6. |
| XI | Cobalt | Chromium | Figure 7. |

EXAMPLE XII

It has been found that in addition to forming an alloy, there is effectively a deposition of the alloying material, thus the final product tends to have an increased strut thickness.

It is therefore desirable to produce an electroplated structure which has a strut thickness less than that desired in the final product and to increase this thickness with the subsequent alloying step. This is attractive commercially in that alloying processes tend to be cheaper than processes involving electrodeposition.

The following experimental results show this effect in the chromizing of 80 p.p.i. nickel foam.

| Sample wt. (gms.) | | Density (gms./cc.) | |
|---|---|---|---|
| Before chromizing | After chromizing | Before chromizing | After chromizing |
| 61.5 | 100.3 | 0.13 | 0.21 |
| 87.5 | 139.5 | 0.17 | 0.27 |
| 163.9 | 239.2 | 0.27 | 0.39 |

The densities were calculated using the average thickness after chromizing.

In addition to the composition across each strut being constant within certain limits, for each sample, it was also found that the compositions of the struts throughout the samples were constant.

The alloy structures of the present invention are useful in a wide variety of applications, particularly by virtue of the fact that the alloy can be tailored to meet a desired purpose. Thus selected alloy structures can replace conventional porous structures in application such as filters, fluid permeable covers, electrodes, heat exchangers, catalyst supports, air bearings, insulators and structure members.

Having now described my invention, what I claim is:

1. A method of producing a cellular structure which comprises electroplating a metal on a conductive porous substrate to produce a layer of metal on said substrate and subsequently alloying the metal by contacting it with at least one alloying component or a precursor thereof at an elevated temperature in order to introduce said alloying component and thus produce a porous alloy structure.

2. A method according to claim 1 in which the metal is a metal of Group I, Group IV, Group VI or Group VIII of the Mendeleeff Periodic Table.

3. A method according to claim 2 in which the metal falls within Periods 4 or 5.

4. A method according to claim 1 in which the metal is nickel, copper, cobalt, titanium, chromium, iron or molybdenum.

5. A method according to claim 1 in which the alloying component is a metal of Group II, Group III, Group IV, Group VI or Group VIII of the Mendeleeff Periodic Table.

6. A method according to claim 5 in which the metal falls within Periods 2, 3, 4 or 5.

7. A method according to claim 1 in which the alloying component is carbon, silicon or nitrogen.

8. A method according to claim 1 in which the alloying component is chromium, molybdenum, titanium, zinc, tungsten, iron, vanadium, manganese, tin, zirconium, copper or an alloy containing one or more of these elements.

9. A method according to claim 1 in which the porous structure is in the form of a skeletal three-dimensional network which defines a plurality of cellular spaces which intercommunicate with one another.

10. A method according to claim 1 in which the conductive porous substrate is a porous plastics material.

11. A method according to claim 10 in which the porous plastics material is a reticulated polyurethane foam.

12. A method according to claim 1 in which the alloying is effected by a diffusion process.

13. A method according to claim 12 in which the electroplated structure is contacted with a gas which is generated by heating a mixture of the alloying component with a halide.

14. A method according to claim 12 in which the diffusion process, comprises heating the electroplated structure, in contact with a powdered alloying component or a compound thereof.

15. A method according to claim 14 in which the electroplated structure is contacted in a reducing atmosphere.

16. A method according to claim 14 in which a halide is present.

17. A method according to claim 16 in which the halide is a chloride.

References Cited
UNITED STATES PATENTS

| | | | |
|---|---|---|---|
| 2,804,410 | 8/1957 | Wyatt et al. | 148—133 |
| 3,271,119 | 9/1966 | Woodberry | 204—30 |
| 3,337,427 | 8/1967 | Whitfield et al. | 204—37 R |
| 3,316,628 | 5/1967 | Lang, Jr. | 204—37 R |
| 3,558,445 | 1/1971 | Rix et al. | 204—37 R |

FOREIGN PATENTS

| | | | |
|---|---|---|---|
| 1,034,548 | 6/1966 | Great Britain | 204—37 R |

JOHN H. MACK, Primary Examiner

W. I. SOLOMON, Assistant Examiner

U.S. Cl. X.R.

204—37 T